United States Patent [19]

Wolpert et al.

[11] 4,203,644
[45] May 20, 1980

[54] SPRING LOCK

[75] Inventors: Richard W. Wolpert, Roslyn Heights; Alan T. Wolpert, Massapequa; John F. Bender, Baldwin; Harold McCormick, Roosevelt, all of N.Y.

[73] Assignee: Union Connector Co., Inc., Roosevelt, N.Y.

[21] Appl. No.: 869,889

[22] Filed: Jan. 16, 1978

[51] Int. Cl.² ............................................. H02B 1/04
[52] U.S. Cl. .................................................... 339/128
[58] Field of Search ........................................ 339/128

[56] References Cited

U.S. PATENT DOCUMENTS

| | | | |
|---|---|---|---|
| 1,975,820 | 10/1934 | Wright | 339/128 |
| 2,664,549 | 12/1953 | Churchill | 339/128 |
| 2,872,139 | 2/1959 | Bedford, Jr. | 339/128 |
| 3,091,679 | 5/1963 | Norden | 339/128 X |
| 3,340,497 | 9/1967 | Balint | 339/128 X |
| 3,402,384 | 9/1968 | Murakami et al. | 339/128 |
| 3,432,802 | 3/1969 | Ritchie | 339/128 |

Primary Examiner—Joseph H. McGlynn
Assistant Examiner—John S. Brown
Attorney, Agent, or Firm—William A. Drucker

[57] ABSTRACT

A device for releasably locking an item in a panel aperture has a bridge on which are carried two wings each with a first edge nearer the bridge and a second edge more remote from the bridge, the first edges being spaced by less than at least part of the second edges. The second edge is an inclined edge, and the unconstrained spacing of the remoter ends of such edges is greater than the width of the panel aperture. When the item is introduced through the panel aperture, with the bridge leading and the wings trailing, a point of contact between the wings and the panel aperture moves onto the second edge, and inherent resilience of the device prevents return movement of the item through the panel aperture.

5 Claims, 7 Drawing Figures

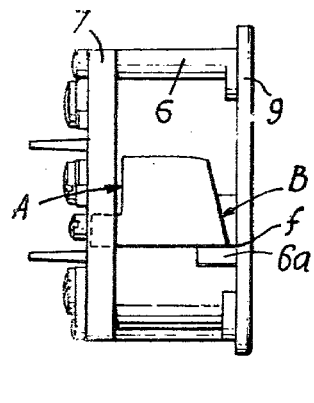
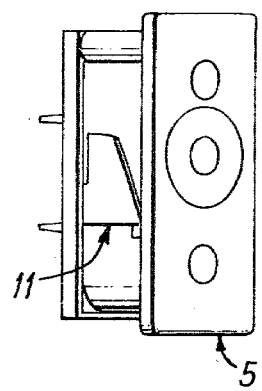
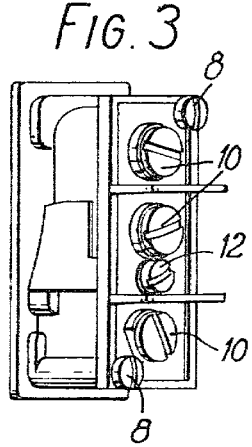
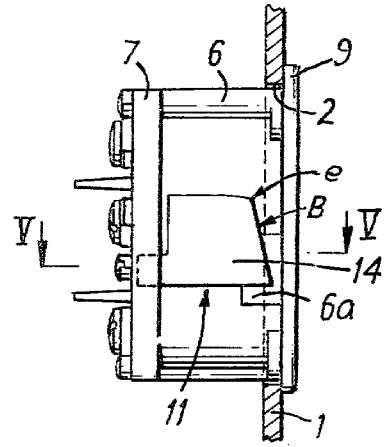
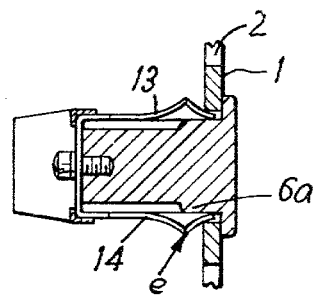
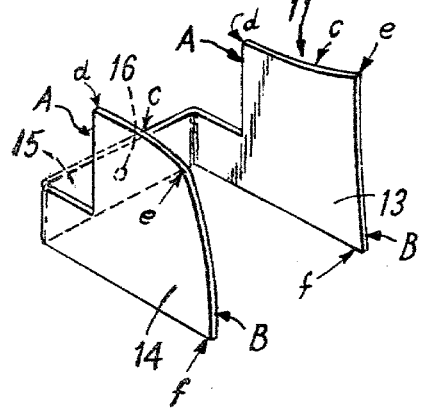
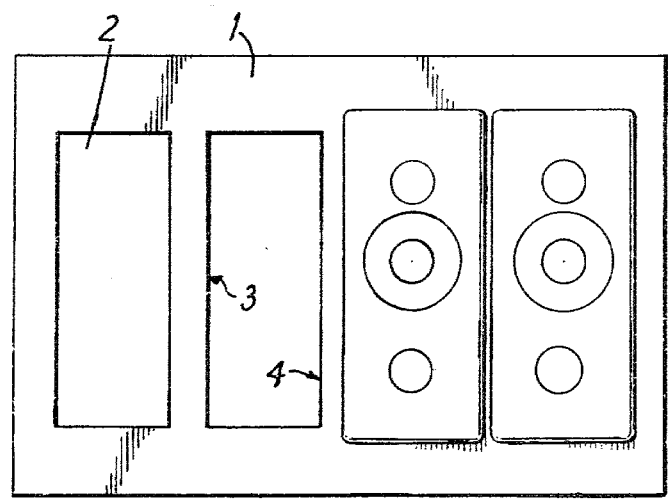

SPRING LOCK

BACKGROUND OF THE INVENTION

In the mounting of items, such as electrical components, in an apertured panel, use is commonly made of screws, bolts and nuts, and other separable fixtures which require time and labor for placement into and release from engagement, and which can readily become loosened, and can get lost.

OBJECTS OF THE INVENTION

A first object of the invention is to provide an improved means, for the releasable locking of an item in a panel aperture, with which only simple pushing of the item into the panel aperture is required, whereupon the locking device securely holds the item in position, but is nevertheless readily releasable when required.

A second object is to provide a combination of such a locking device with a panel and a panel-mounted item such as an electrical component.

SUMMARY OF THE INVENTION

According to the invention a device for the releasable locking of an item in a panel aperture bounded by two spaced opposed edges comprises a bridge portion for securing to the item, and first and second wing portions carried at spaced opposed positions on the bridge portion. At least part of the device is resiliently deformable to permit approaching and separating movement of the wings. Each wing has a first edge nearer to the bridge portion, and a second opposed edge more remote from the bridge portion. The respective first boundaries are spaced by less than the spacing of the opposed edges of the panel aperture. The second edge terminates at each end in respective first and second tips. The spacing of the second tip from the first edge is greater than the spacing of the first tip from the first edge. The unconstrained spacing of the second tips from each other is less than the unconstrained spacing of the first tips from each other. The unconstrained spacing of the first tips is greater than the spacing of the opposed edges of the panel aperture.

BRIEF DESCRIPTION OF THE DRAWINGS

In the drawings:

FIG. 1 is a side elevation of an electrical component incorporating the locking element of the invention;

FIG. 2 is a perspective view of the electrical component, seen from the front and one side;

FIG. 3 is a perspective view of the electrical component, seen from the rear and the other side;

FIG. 4 is a view, partially in side elevation and partially in section, to show the manner of locking engagement of the element in an aperture in a panel;

FIG. 5 is a section taken on the line V—V of FIG. 4;

FIG. 6 is a perspective view, on an enlarged scale, of the locking element;

FIG. 7 is a front elevation of a component-mounting panel having a plurality of apertures in one of which a component is engaged by means of the locking element of the invention.

DESCRIPTION OF THE PREFERRED EMBODIMENT

The locking element is intended for the releasable locking in position of an item on an apertured panel. The nature of the panel is immaterial, save only that the panel must be of stiff sheet material having a thickness within the limits for which the particular dimensions of the locking element are selected, and must include an aperture bounded by two opposed edges the separation of which, where they are contacted by the locking element, must lie within limits determined by the dimensions selected for the locking element.

The nature of the item is immaterial, save only that it must be of stiff material and must include a body portion capable of passing through the aperture of the panel, and must further include stop means adapted to abut against a face of the panel to prevent the component from passing through the panel aperture.

In the drawings, the panel is shown as a plane sheet 1 of metal having in it a rectangular opening 2 with opposed parallel side edges 4 (see FIG. 7). The component is a connector block 5 which includes a body portion 6 on which a backplate 7 is secured by screws 8. At the front of the body portion 6 there is a front plate 9 which, in this example, serves as the stop means. For this purpose the front plate 9 is made of width and length greater than the dimensions of the aperture 2. The dimensions of the body portion 6 are selected such that the body portion is a clearance fit through the aperture 2. The backplate 7 carries a set of three terminal screws 10, the outer two of which may conveniently serve as pole connections, and the center one of which may conveniently serve as an earth point.

A locking element, designated generally by reference 11 (see FIG. 6) is secured on the back plate 7 by a screw 12. If it is desired to have connection between the center terminal 10 and the panel, there may be provided a metal connecting strip or insert (not shown) common to both the center terminal 10 and the screw 12, or the locking element may have a lug portion (not shown) contacting the center terminal.

The locking element 11 comprises essentially a first wing 13 and a second wing 14 connected at a first edge A to a bridge 15. The spacing of the edges "A" is less than the width of aperture 4. The bridge and wings are integral and are made of a resiliently deformable material such as sheet metal. The bridge is provided with a round hole 16 to receive the fastening screw 12, or the round hole may be replaced by a slot opening at the upper or lower edge of the bridge. The wings are of slightly more than twice the height of the bridge and at their outer edge "B" more remote from the bridge they are angled at an inclination to the plane of the bridge, as shown at edge 17.

The spacing of the second tips 18 from the respective edge "A" is greater than the spacing of the f from the respective edge "A".

In the unconstrained condition of the locking element, the wings 13 and 14, at least at their upper part, are divergent in the direction away from the bridge, and the separation of the second tips f of the wings is preferably less than the spacing between the parallel side edges 3 and 4 of the panel aperture, (see FIG. 7).

For the easier identification of the various portions of the locking element, in relation to the appended claims, the following reference letters are used in FIG. 6 of the drawing:

A=first edge
B=outer edge
C=upper edge
D=inner end of edge "c"
E=first tip

F=second tip

For engagement of the connector block 5 releasably into the panel 1, without the use of screws and other known fixing means, the body portion 6 of the connector block is introduced through the panel aperture, from the front face of the panel towards the rear face. At an intermediate point in the total travel required for insertion of the body portion 1, the upper edges "C" of the wings 13, 14 will abut against the parallel side edges 3 and 4 of the aperture. Further inward movement of the body portion through the aperture, accompanied by resilient forcing towards each other of the wings, causes the point of abutment to ride off the edges c and then along the inclined edges B. When the inward movement of the body portion is terminated by abutment of the front plate 9 against the front face of the panel, the side edges 3 and 4 are abutted by the respective inclined edges B of the locking element at a point of the edges B which will be determined by the thickness of the material of the panel. The wings 13 and 14 are urged away from each other by their own resilience, and accordingly the respective inclined edges B are forced firmly against the respective side edges 3 and 4. The body portion 5 is thus prevented from inward movement by the abutment of the front plate 9 against the front face of the panel and is prevented from outward movement by the abutment of the wings against the rear face of the panel. To increase the resistance of the wings to movement towards each other, the body portion may include respective abuts 6a which are contacted by the second tips f so that inward movement of the first tips e can only be obtained by additional twisting deformation of the wings.

Depending upon the angle of inclination of the angled edges B to the plane of the bridge 15, and on the resilient strength of the sheet material used to form the locking element, the engagement between the locking element and the panel may be such as to be overcome by an overriding force exerted on the body portion to pull it back in the rear-to-front direction, whereupon the point of contact between panel aperture and locking element would ride back along the edges B and then the upper edges c, and permit extraction of the component from the panel aperture. However, it is preferred to make the angle of inclination of the edges B, and/or the resilient strength of the material, such as to prevent simple pulling out of the component without first moving the two wings towards each other, e.g. manually or by use of a tool, at the rear of the panel, so as to disengage from the opposed side edges of the panel aperture, and thereafter removing the body portion through the panel aperture.

The locking element provides a simple, robust, low-cost device, without separable parts to get lost, which permits secure attachment of a component to a panel, and its subsequent removal, in a novel and advantageous manner.

The invention is not limited to the embodiment which has been described with reference to the accompanying drawings and it will be apparent to those skilled in the art of the manufacture of panels, panel-mounted items, and resiliently deformable items that variations may be made within the scope of the appended claims.

I claim:

1. A device, for the releasable locking of an item in a panel aperture bounded by two spaced opposed edges, comprising:
   (i) a bridge portion for securing to the item, and
   (ii) first and second wing portions carried at spaced opposed positions on said bridge portion, at least part of the device being resiliently deformable to permit approaching and separating movement of the wings, each wing portion having a first edge which extends in the direction away from the bridge from an inner end to a first tip of the wing, each wing portion having an outer edge which terminates at one end at said first tip and at the other end at said second tip, the spacing from each other of the inner ends being less than the spacing of the opposed edges of the panel aperture, the spacing of the first tip of each wing from the plane of the bridge being less than the spacing of the second tip from the plane of the bridge, the unconstrained spacing of the first tips from each other being greater than the spacing of the opposed edges of the panel aperture.

2. A locking device, as claimed in claim 1, made in one piece of resiliently bendable sheet metal.

3. A locking device, as claimed in claim 1, wherein the bridge portion is a plane strip.

4. A locking device, as claimed in claim 1, further comprising, positioned on the item, abutment means to be abutted by the second tips of the wings for increasing the resistance of the wings to approaching one towards the other.

5. In combination:
   (a) a locking device as claimed in claim 1,
   (b) a panel including a plane area having parallel opposed major faces and including an aperture with first and second spaced opposed edges
   (c) an item, for mounting on said panel, including a body portion adapted for insertion into the panel aperture, and stop means to abut against a major face of the panel,
the locking device being secured to the body portion by the bridge portion with the wing portions directed towards the stop means, the spacing of the first tip of each wing portion from the stop means being greater than the thickness of the panel plane area, and the spacing of the second tip of each wing portion from the stop means being less than the thickness of the panel plane area.

* * * * *